United States Patent
Makuch et al.

(10) Patent No.: US 6,330,592 B1
(45) Date of Patent: Dec. 11, 2001

(54) METHOD, MEMORY, PRODUCT, AND CODE FOR DISPLAYING PRE-CUSTOMIZED CONTENT ASSOCIATED WITH VISITOR DATA

(75) Inventors: Michael K. Makuch, Austin; Neil Webber, Round Rock, both of TX (US)

(73) Assignee: Vignette Corporation, Austin, TX (US)

( * ) Notice: Subject to any disclaimer, the term of this patent is extended or adjusted under 35 U.S.C. 154(b) by 0 days.

(21) Appl. No.: 09/205,077

(22) Filed: Dec. 5, 1998

(51) Int. Cl.$^7$ ........................................... G06F 15/16
(52) U.S. Cl. ..................... 709/217; 709/203; 711/118; 707/10
(58) Field of Search ..................... 709/224, 223, 709/217; 711/118; 707/10

(56) References Cited

U.S. PATENT DOCUMENTS

| | | | |
|---|---|---|---|
| 5,572,643 | * | 11/1996 | Judson ................................. 709/218 |
| 5,727,129 | * | 3/1998 | Barrett et al. ........................... 706/10 |
| 5,740,430 | | 4/1998 | Rosenberg et al. ................... 395/616 |
| 5,796,952 | * | 8/1998 | Davis et al. ........................... 709/224 |
| 5,870,559 | * | 2/1999 | Leshem et al. ....................... 709/224 |
| 5,878,223 | * | 3/1999 | Becker et al. ......................... 709/223 |
| 5,958,008 | * | 9/1999 | Pogrebisky et al. .................. 709/223 |
| 6,067,565 | * | 5/2000 | Horvitz ................................. 709/218 |
| 6,085,226 | * | 7/2000 | Horvitz ................................. 709/203 |
| 6,094,662 | * | 7/2000 | Hawes ................................... 707/104 |
| 6,112,279 | * | 8/2000 | Wang ..................................... 711/119 |
| 6,128,655 | * | 10/2000 | Fields et al. .......................... 709/219 |
| 6,138,141 | * | 10/2000 | DeSimone et al. ................... 709/203 |
| 6,141,737 | * | 10/2000 | Krantz et al. ......................... 711/171 |
| 6,185,586 | * | 2/2001 | Judson ................................. 707/513 |
| 6,185,608 | * | 2/2001 | Hon et al. ............................. 709/216 |

* cited by examiner

Primary Examiner—Krisna Lim
(74) Attorney, Agent, or Firm—Gray Care Ware & Freidenrich, LLP

(57) ABSTRACT

Visitor interests can be tracked by including "keyword directives" in content contained within the web site. These keyword directives specify a keyword indicating the type of category of information represented by the content. As the content is delivered to the visitor in the form of a web page, the number of keyword directives attached to the content is accumulated into a specified visitor profile. Over time, this visitor profile can represent the types of information the visitor has viewed and serve as an indicator of his or her preferences. In this way, the invention can accumulate a visitor profile unobtrusively, without requiring the visitors to fill out a survey or questionnaire. The profile may also be augmented with explicit information the visitor provides over time, such as a name or address provided when ordering a product from the site. The invention then delivers personalized pages to the visitor by examining such visitor's profile.

19 Claims, 3 Drawing Sheets

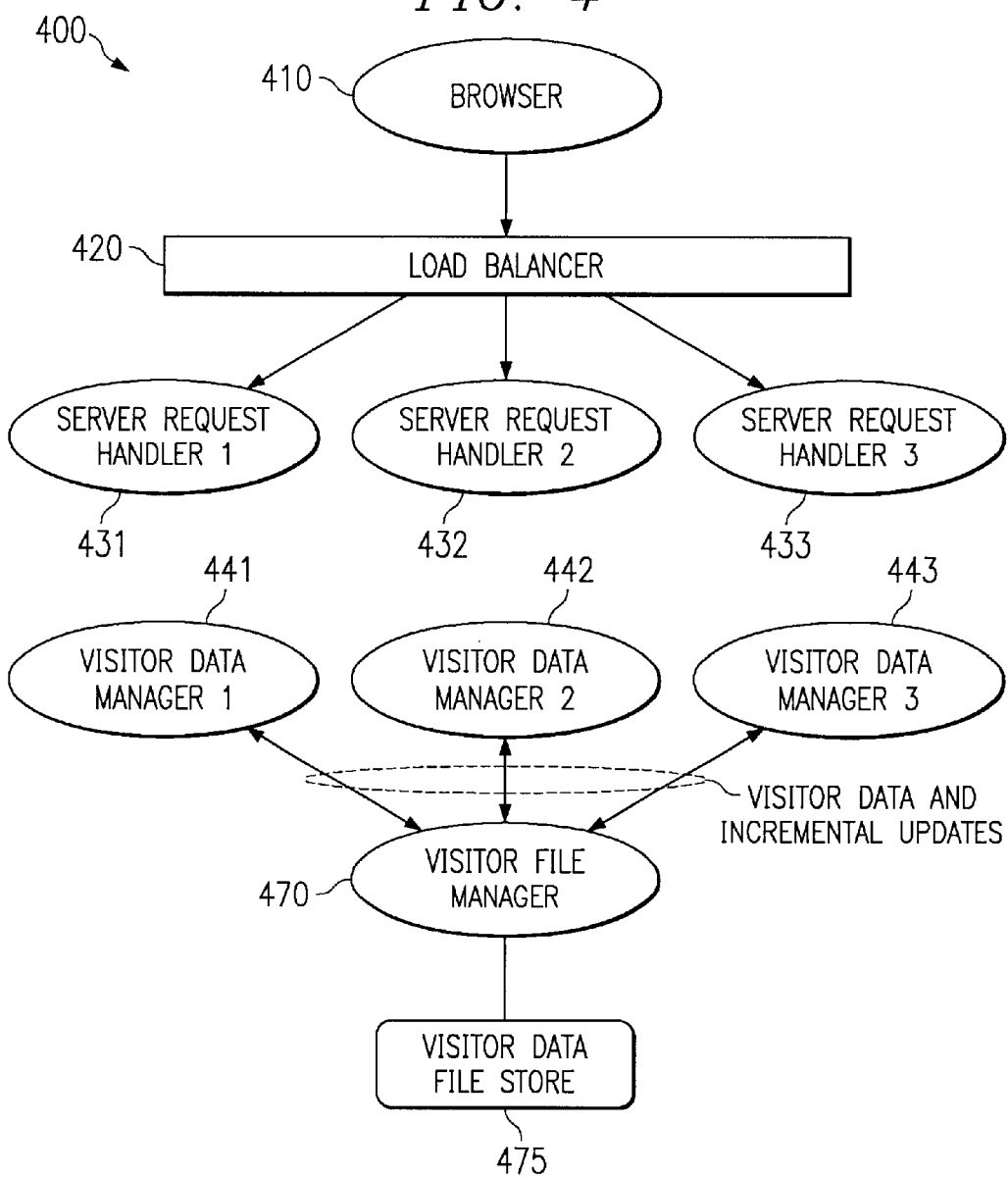

METHOD, MEMORY, PRODUCT, AND CODE FOR DISPLAYING PRE-CUSTOMIZED CONTENT ASSOCIATED WITH VISITOR DATA

TECHNICAL FIELD

This invention relates generally to the usage of a computer network by a user as more specifically to the techniques of providing specialized information to a network user based on accumulated user data.

BACKGROUND

The World Wide Web (WWW) of computers is a large collection of computers operated under a client-server computer network model. In a client-server computer network, a client computer requests information from a server computer. In response to the request, the server computer passes the requested information to the client computer. Server computers are typically operated by large information providers, such as commercial organizations, governmental units, and universities, and are typically referred to as "web sites". Client computers are typically operated by individuals.

To ensure interoperability in a client-server computer network, various protocols are observed. For example, a protocol known as the Hypertext Transport Protocol (HTTP) is used to move hypertext files across the WWW. In addition, the WWW observes several protocols for organizing and presenting information, two examples being the Hypertext Markup Language (HTML) and the Extensible Markup Language (XML). The information delivered by the server computer is typically referred to as a "web page".

A server computer can use a technique known as "dynamically-generated customized pages" to create a web page in response to a request for information from a client computer. A dynamically-generated customized page results in a set of information in a particular format. For example, a first client computer may support the ability to represent information in a number of columns, while a second client computer may support the ability to represent information in a table. Thus, a server computer receiving a request from the first client computer can dynamically generate the requested information in a format with columns. It can respond to a request from the second client computer by dynamically generating the requested information in table format. In this example, two customized pages are created to represent the same information.

It is not unusual for a server computer on the WWW to contain thousands or even tens of thousands of web pages. This large quantity of e makes it difficult for a person, i.e., a "web site visitor", operating a client computer to locate the information of most interest to them. In much the same way that dynamically-generated customized pages can be used to present the same information in a different presentation format for each client computer, dynamically-generated customized pages can be used to select the information to be displayed so that each web site visitor may see information customized to their specific interests. This process is known in the art as personalization.

Personalization can be achieved through current technology using survey questions to ascertain the visitor's interests, and using dynamically-generated customized pages compute customized pages for each visitor. There are two disadvantages to this approach. First, web site visitors frequently prefer to not fill out questionnaires when visiting a web site, making it difficult for a site to gather the necessary visitor preference data. Second, dynamic generation of every page on a server computer does not scale well for large numbers of requests. In other words, existing methods provide a relatively slow response when a large number of requests are made for personalized pages. This slow response time is attributable to the fact that in existing systems a computer program must be executed to completely generate each dynamic page on every single request.

In view of the foregoing, it would be highly desirable to provide a technique to unobtrusively gather web site visitor preference data and efficiently respond to a large number of requests for personalized pages.

SUMMARY OF THE INVENTION

The invention is a method and apparatus for learning in what a visitor is interested and what demographics the visitor may demonstrate so as to deliver personalized information to the visitor based upon accumulated data, and to do so without requiring dynamic page generation for each individual visitor.

For example, a visitor may demonstrate interest in football and, in particular, his favorite football team. The present invention learns this by observing the behavior of the visitor, i.e., which sports articles he reads and if such articles are focused even further. If a tendency is observed, the learned knowledge is then used to deliver more information about that team to the visitor. Such preferred articles can be recycled by having the invention deliver the same information to other visitors who have the same favorite team.

Visitor interests can be tracked by including "keyword directives" in content contained within the web site. These keyword directives specify a keyword indicating the type of category of information represented by the content. As the content is delivered to the visitor in the form of a web page, the number of keyword directives attached to the content is accumulated into a specified visitor profile. Over time, this visitor profile can represent the types of information the visitor has viewed and serve as an indicator of his or her preferences. In this way, the invention can accumulate a visitor profile unobtrusively, without requiring the visitors to fill out a survey or questionnaire. The profile may also be augmented with explicit information the visitor provides over time, such as a name or address provided when ordering a product from the site.

The present invention then delivers personalized pages to the visitor by examining such visitor's profile. Another directive, called a personalization directive, may be placed into web pages that are to be customized by the invention. These directives cause a personalization function to be applied to the visitor's profile data. The result of the personalization function defines an attribute to be used for locating personalized page fragments, called "page components", that the invention then assembles into a customized page for the visitor. In this manner, each visitor may receive a page containing three different classes of data: common data received by all visitors, personalized data received by a similar group of visitors, and individual data received only by this one visitor. The present invention assembles all of this data and delivers a "personalized" page to the visitor.

The present invention stores personalized page components in a cache. Subsequent delivery of the same page components is satisfied by retrieving the information from the cache, rather than by dynamically generating it each time. The present invention can therefore take advantage of a common situation where large groups of visitors share similar interests and should receive the same data. Since previously generated personalized page components need not be re-generated for every visitor, computational overhead is reduced tremendously by supplying such pre-generated page components.

For example, a home page for a large web site might include a personalization directive describing the inclusion of an article related to a visitor's favorite NFL team. The personalization directive function examines the visitor profile, determines the favorite team, and includes the appropriate page with information about that team. In this way, each visitor to the web site might receive a different introductory web page, customized for their preferences. Even though every visitor receives a page that appears to be customized for them, since, in fact, there are only 30 or so NFL teams; the caching mechanism of the invention ensures that the dynamic page generation only occurs at most 30 or so times. If one million visitors come to the site, most of the visitors simply receive a web page that was already dynamically generated for a previous visitor. In essence, the invention allows "personalized" pages to be constructed by choosing from a set of previously computed pages, rather than by dynamically computing each page for every visitor.

It is a primary object of the present invention to provide an efficient mechanism for gathering visitor preference and behavior information and storing it in a visitor profile.

Another object of the invention is categorizing content in a web site and associating viewed categorized content with a user to develop a visitor profile.

It is another object of the present invention to provide a highly efficient and scalable mechanism for assembling personalized pages based on information contained in the visitor profile, without requiring a full dynamically-generated customized page computation for each visitor.

It is still another object of the present invention to allow for specific data from the visitor profile to be directly inserted into personalized pages.

Yet another object of the invention is to insert pre-customized content into various areas of a single web page.

It is a further object of the invention to allow for visitor profile data to be based on the actual content viewed by the visitors.

It is another object of the invention to allow for visitor profile data to be gathered and updated efficiently even in the case where multiple web servers are operating simultaneously to deliver information to users in parallel.

It is another object of the invention to provide efficient management and storage of visitor profile data for large web sites that may have as many as 10 million visitors or more.

The above objects of the invention and the brief description of the preferred embodiment should be constructed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 4 illustrates the invention configured for use with multiple server computers.

DETAILED DESCRIPTION OF THE INVENTION

Figure 1:
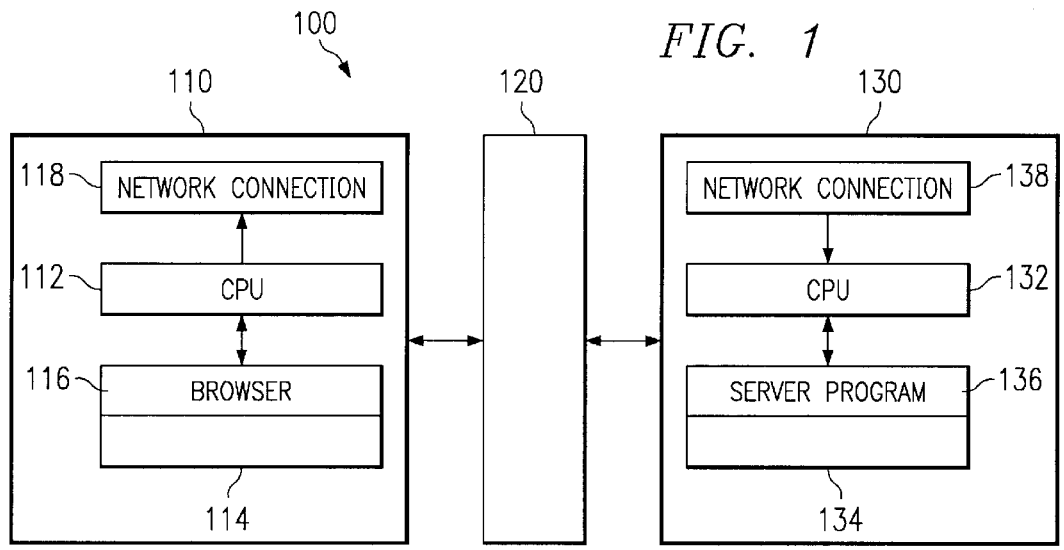
FIG. 1 illustrates a client-server computer network that may be operated in accordance with the present invention.

FIG. 1 illustrates a client-server computer network 100 that may be operated in accordance with the present invention. For the preferred embodiment, the network 100 includes at least one client computer 110 and at least one server computer 130. The client computer 110 and the server computer 130 are connected by a transmission channel 120, which may be any wire or wireless transmission channel.

The client computer 110 may be a standard computer including a Central Processing Unit (CPU) 112 connected to a memory (primary and/or secondary) 114. The memory 114 stores a number of computer programs, including a "browser" 116. As known in the art, a browser is used to communicate with remote server computers 130 and to visually present the information received from such computers. The client computer 110 establishes network communications through a standard network connection device 118.

The server computer 130 includes standard server computer components, including a network connection device 138, a CPU 132, and a memory (primary and/or secondary) 134. The memory 134 stores a set of computer programs to implement the processing associated with the invention. These programs are collectively referred to as a the web server software 136. The invention may be used with any web server software, including, but not limited to, Netscape Enterprise Server from Netscape Inc., Internet Information Server from Microsoft, or Apache from the Apache HTTP Server Project.

Figure 2:
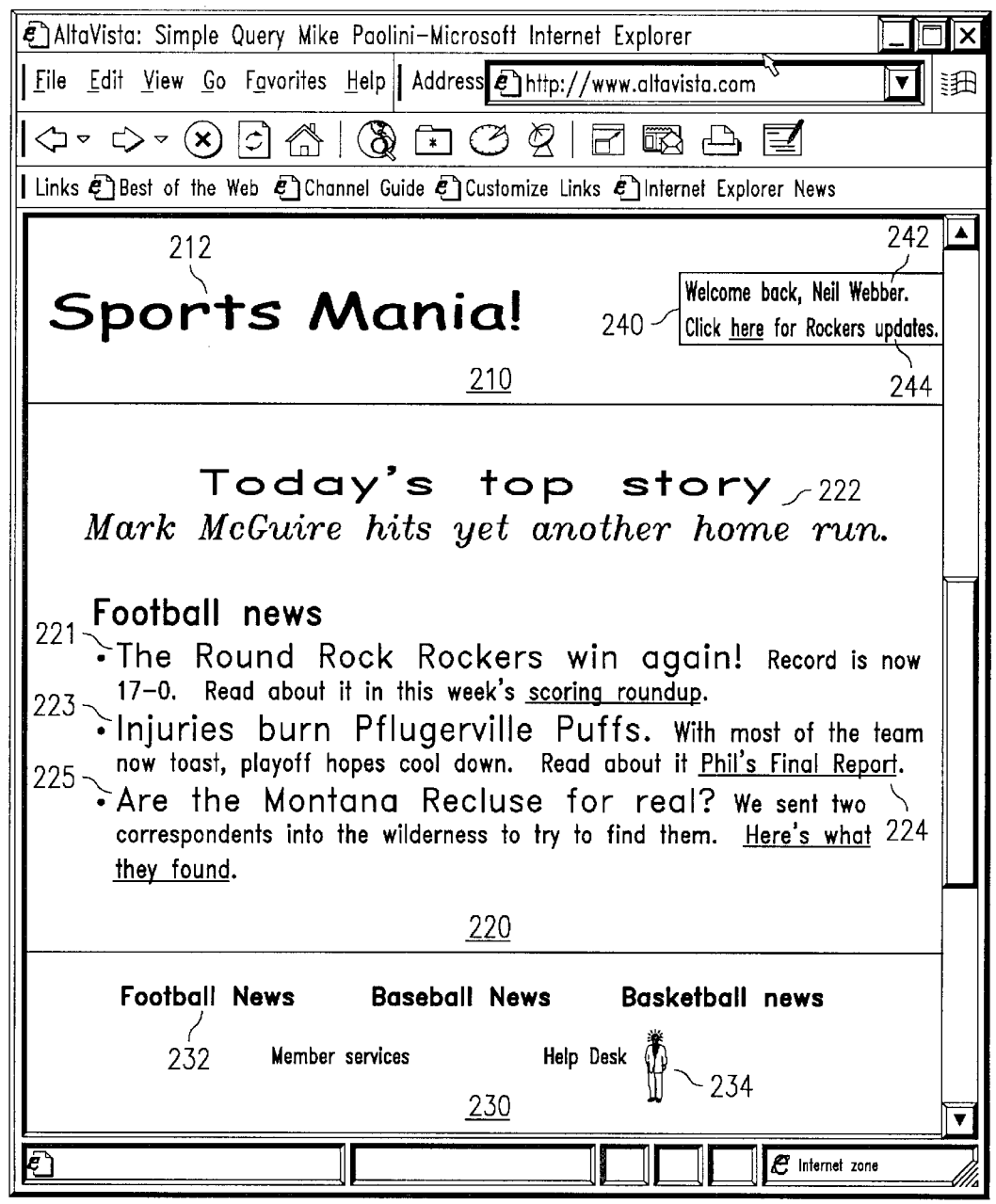
FIG. 2 is an example page delivered by a web server.

FIG. 2 illustrates a typical web page 200. The web page contains graphical information and textual information. Web page design varies greatly, but usually follows a general pattern of being divided up into sections of related information. In the provided example, there are four areas of information 210, 220, 230, and 240. In the terminology of the invention, each of the distinct sections of the web page, such as 210, 220, 230 and 240, are called 'components'. The component on top 210 contains a company logo graphic 212. Below it is a component 220 containing sports news stories intended to be of interest to the web site visitor. At the bottom 230 is what is called in the art a "navigation bar" containing hyperlinks 232, 234 to other web pages on the site. In the preferred embodiment, a hyperlink is defined by HTML (or any other appropriate markup language) as a point-and-click mechanism implemented on a computer that allows a viewer to link (or jump) from one screen display where a topic is referred to (called the 'hyperlink source') to other screen displays where more information about that topic exists (called the 'hyperlink destination'). A hyperlink thus provides a computer-assisted way for a human user to efficiently jump between various web pages containing related information. Hyperlinks can be graphical 234, stylized text 232, or even plain text 224, conventionally formatted with underlining.

In the example of FIG. 2, the small component 240 on the page illustrates personalized information as provided in the manner of the present invention. The first line 242 shows an example of 'monogramming', where the generic information on the page has been customized with information specific to a particular web site visitor. The next line 244 shows an example of the results of a personalization directive. The information on the page has been customized to reflect the fact that this visitor, preferably based on prior visits, has demonstrated interest in the Round Rock Rocker's football team; therefore, a custom hyperlink 244 has been added to the page to provide the visitor with a quick way of obtaining more information about their favorite team.

The main story component 220 shows another example of personalization. Visitors interested in football can be shown a set of football stories 221, 223, 225; whereas other visitors may be shown basketball or baseball stories.

This type of personalization can be achieved in the prior art only by forcing the user to explicitly answer survey questions and creating individualized pages. For example, a survey would ask the visitor whether the visitor preferred to see football or baseball stories, and then ask the visitor for their favorite teams in order to obtain profile information. Furthermore, current technology would require that every page on the web site be generated dynamically for each visitor, which results in slow response times and poor performance.

The present invention solves the problem of explicit questions and the performance problem. In the preferred embodiment, the method is implemented on a web site server. When the web site is being developed, "Web Content Items" are created by the developers of the web site. Web Content Items can be an entire web page, a component of a web page, an insertion into a web page, a graphic link and/or any other items that can be accessed and viewed by a user. Often times a content item is a self-contained story or fragment of data; for example, the individual stories 221, 223, 225 are each a Web Content Item. Web Content Items can reside at more than one URL. The Web Content Items are preferably defined through a markup language, including, but not limited to, HTML.

In the preferred embodiment the developer can then assign at least one category and/or a keyword to each of the Web Content Items. These categories and key words are used to determine visitor interest when they access Web Content Items on a Web Site.

In such a preferred embodiment, the developer thereby defines all the categories that can be used within the system. The categories might be broad definitions and/or include keywords. The developer can then devise a set of Web Content Items that can 'personalize' the Web Site for the visitor the next time the visitor accesses the web site. This personalization can be done according to the accumulated data in the visitor's file, gathered implicitly by observing which Web Content Items, and therefore which categories have been of interest to the visitor in the past. The 'personalization' will not be a one-time dynamically generated customized web page, which would be too resource intensive and therefore slow, but will be based on predetermined Web Content Items that are developed and then cached into memory.

The accumulation process functions when a visitor accesses a URL and the associated Web Content Items. At that point the program registers the representative categories belonging to the web page. If this is a new visitor, a new "visitor file" for that visitor is created; otherwise, a previous visitor file is accessed. In either case, the statistics on the accessed categories is updated in the visitor's file.

The visitor file contains a Lining tally of the visitor's interest preferably based on accessed Web Contents Items. In a preferred embodiment, an algorithm is included that gives greater weight to more recently accessed Web Content Items, thereby accounting for changing interests and tastes.

When a visitor accesses a web site that has an existing file for that visitor, the program determines from the file and the tallied categories, which pre-customized content, i.e., the personalized page components, to provide to the visitor.

Such predetermined content is cached in memory and is, preferably, designed by a web site to appeal to interests in certain topics.

The benefits of the present invention are immediately evident. The present invention gives the visitor the impression of a customized page visitor when in actuality it presents pre-customized pages and/or page components that have been cached. The system thereby conserves computing resources and retains a higher access speed on a server as opposed to those systems that dynamically generate customized pages for each visitor.

In the alternative embodiment, the pre-customized pages have at least one base Web Content Item and insert areas wherein personalized page components are provided and inserted to make each page appropriate for a given preference. In another alternative embodiment, the entire page can be obtained from the cache.

Returning to FIG. 2, the page is illustrative of how a base page is pre-customized to make it seemingly customized for a given visitor. Assuming that a visitor frequents a sports-oriented web site in the preferred embodiment, the main story on the page could be the same for all the pre-customized pages, for example, a Super Bowl story; however, the additional stories on the page can be adjusted with inserts of personalized page components items according to the visitor's preferences, such as individual team information. Assuming that visitor A in prior visits has frequented a number of Web Content Items with a keyword of "football", then when visitor A returns to the web site a page with personalized page components will appear where the page components (e.g., 221, 223, 225) are Web Content Items comprising football-related stories.

Figure 3:
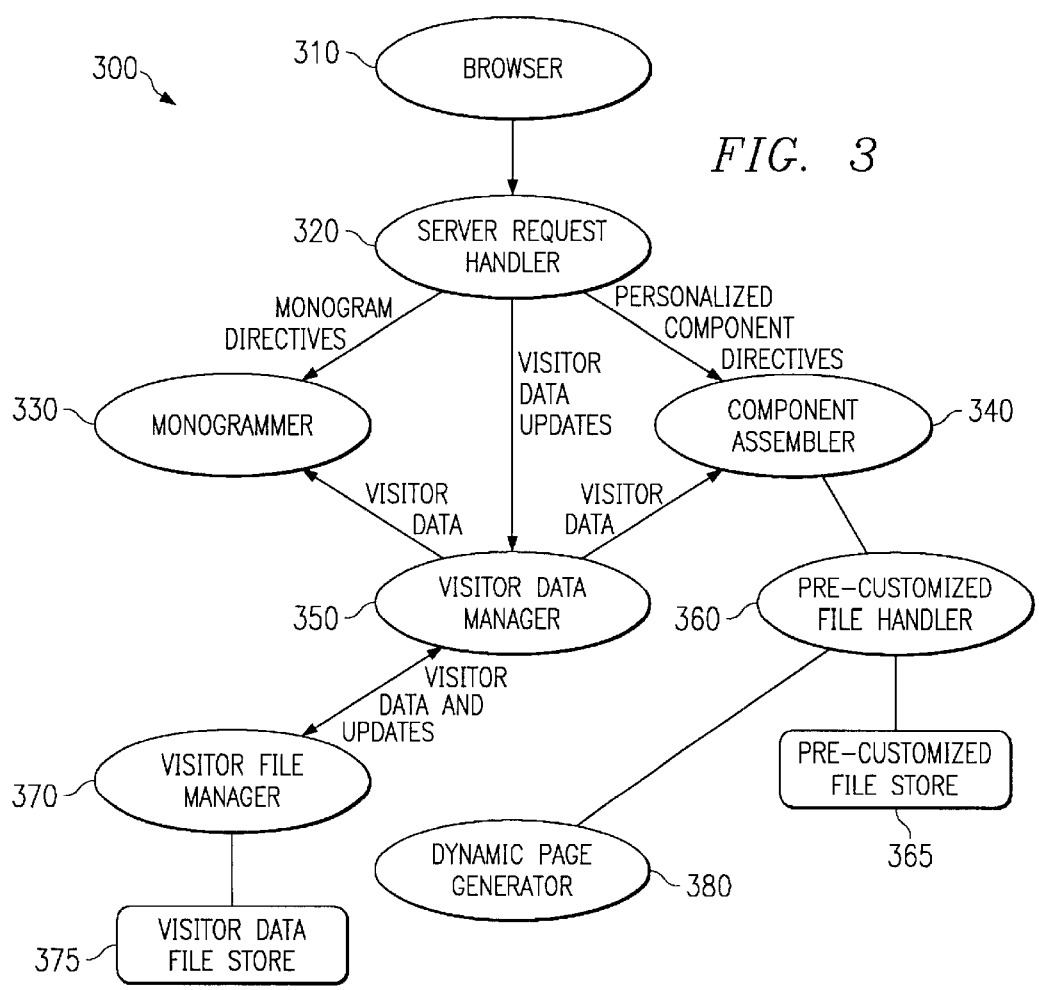
FIG. 3 illustrates a relationship diagram of the primary components in the present invention.

FIG. 3 shows a relationship diagram for the invention. Requests begin when a browser 310 operating on a client computer (as in 110 in FIG. 1) makes a request to the web site server (as in 130 in FIG. 1). When the site is being accessed, the server request handler 320 analyzes the incoming request and the corresponding pages, and invokes the monogrammer 330 and the component assembler 340 as necessary.

The component assembler 340 examines the visitor file, if any, to determine if there is a preference to be associated with the accumulated categoly and keyword counts of the visitor. The visitor file is obtained from the visitor data manager 350, which serves as a central coordination point for retrievals and updates of visitor data within a single web server. If there is no file for this visitor, the program generates a file based on the visitor so as to determine the visitors reference for the next page requested.

If a visitor file exists for the current visitor, the program accesses such visitor file to determine the visitor's interests as determined by the keywords associated with prior Web Content Items served, and, in one embodiment, there may be a weighing factor or other algorithmic determination for the additional Web Content Items viewed by the visitor during the most recent usage. The program then selects a pre-customized page or pre-customized page components which should reflect this interest. These selections can be assembled by a component assembler 340, and may be further subject to personal modification by a monogrammer 330 to make changes such as inserting the visitor's name onto the page.

The component assembler uses the pre-customized file handler 360, to retrieve the Web Content Items, formatted as pre-customized pages, that are appropriate for this visitor. Pre-customized pages can be cached in a pre-customized file store 365, or can be dynamically generated on demand by the dynamic page generator 380.

The visitor may select any hyperlink on such page to access additional interesting content.

In addition, the visitor can still be shown other content not necessarily directly related to his or her interests. The visitor can still access these hyperlinks and URLs; therefore, in the preferred embodiment, the visitor file is an evolving file, since the visitor's interests can change over time for a number of reasons. Therefore, the present invention can allow an option to give greater weight to recently accessed Web Content Items.

The server request handler 320 can then update the visitor file data with the categories and keyword counts for the information assembled into the final page that is returned to the visitor's browser. The updated visitor file data is delivered back to the visitor data manager 350 and stored in the visitor data file store 375 by the visitor file manager 370.

FIG. 4 shows another embodiment 400 of the invention wherein there are multiple instances of the Server request handler and associated machinery. Web sites often use this form of functional replication to achieve higher performance by sharing the load across multiple server machines. A load balancer, such as a Cisco Local Director, a DNS round robin, or equivalent technology exists between the web site visitor's browser 410 and a set of server request handlers 431, 432, 433. Each server request handler is a complete copy and typically each one operates on a separate machine. The server request handlers each have their own visitor data manager 441, 442, 443. As a visitor makes multiple requests to the web site, each individual request may be redirected by the load balancer to a different request handle and visitor data manager. Therefore, as the category and keyword counts are updated by each individual server, some special mechanism must be used to ensure that updates are not lost by having one set of visitor data overwrite the results of another. This is the reason for having the visitor file manager 470 as a separate mechanism within the invention. There is only one visitor file manager and it serves as the collection point for all updated data generated by the individual visitor data managers 441, 442, 443. A further refinement is that the visitor data managers communicate an incremental update value to the visitor file manager. For example, consider the case where a visitor makes two requests to the web site, with each request being for a page containing keyword "A". The first request might be handled by server request handler 432 (and visitor data manager 442). The second request might be handled by server request handler 443 (and visitor data manager 443). Each one of these data managers has a visitor profile stating that the visitor saw one instance of the keyword "A". However, when each reports its results back to the visitor file manager 470, the visitor file manager sums the results together thus obtaining the correct value of two instances for the keyword "A". The final results is written into the visitor data file store 475 and made available for future operations.

It should be appreciated by those skilled in the art that the specific embodiments disclosed above may be readily utilized as a basis for modifying or designing other methods for carrying out the same purposes of the present invention. It should also be realized by those skilled in the art that such equivalent constructions do not depart from the spirit and scope of the invention as set forth in the appended claims.

What is claimed is:

1. A method of customizing a web site, said method comprising:

labeling content of the web site;

when at least one visitor accesses the content of a web site, registering the labeled accessed content in a personalized data file;

storing the data file for the at least one visitor;

generating at least one pre-customized display for a first visitor;

caching the at least one pre-customized displays on the server computer;

displaying the at least one pre-customized display to the first visitor;

analyzing the data file of a second visitor and associating the second visitor with the at least one pre-customized display, wherein analyzing is performed after generating; and displaying the at least one pre-customized display to the second visitor, wherein the at least one pre-customized display is not regenerated before displaying the at least one pre-customized display to the second visitor.

2. The method of claim 1 wherein labeling the content of the web site comprises attaching at least one category to each web content item.

3. The method of claim 2 wherein registering the labeled accessed content comprises accumulating the number of accesses to each category in the personalized data file.

4. The method of claim 3 wherein analyzing the data file comprises:

prioritizing the categories in the data file; and associating the highest weighted category with at least one pre-customized display.

5. The method of claim 1 wherein the pre-customized display is an insert to be placed within a web content item.

6. The method of claim 1 wherein the pre-customized display is a web page.

7. The method of claim 1 wherein the generating of a pre-customized display is not generated until a first visitor first requires such a display.

8. The method of claim 1 wherein storing the data file can be performed by multiple servers operating in parallel, without loss of information.

9. The method of claim 1 wherein the displaying of the pre-customized display comprises inserting a plurality of pre-customized displays onto a web page accessed by the visitor.

10. A computer-readable medium having computer executable software code stored thereon, the code for personalizing a web site without dynamically generated web pages for each visitor, the code comprising:

code for labeling the content of a web site with selected categories;

code for generating a data file for a visitor;

code for accumulating information regarding labeled content, to place such information in the visitor data file;

code for determining the selected category associated with the visitor's interest, wherein such determination is based on the accumulated information in the visitor data file; and code for presenting cached pre-selected web content to the visitor, wherein such pre-selected web content is associated with the selected category.

11. A computer readable memory that can direct a web site server computer to function in a specified manner, comprising:

visitor files stored in said computer memory of said web site server computer;

pre-customized web content items stored in said computer memory of said web site server computer; and executable instructions stored in said computer memory of said web site server computer, said executable instructions including
(a) instructions to access an existing visitor file for a visitor;
(b) instructions to review data in existing visitor file to determine visitor preferences; and
(c) instructions, based on said visitor preferences, to provide pre-customized files to visitor.

12. The computer readable memory of claim 11 wherein the pre-customized files are pre-customized web content items.

13. The computer readable memory of claim 11 wherein the existing visitor file contains visitor preference data.

14. The computer readable memory of claim 13 wherein the visitor preference data contains a count of keywords.

15. The computer readable memory of claim 14 wherein the keywords have a weighted value dependent upon the time of access of associated web content.

16. A computer program product for operating a web site on a server computer, the computer program product comprising:

a computer usable medium having computer readable program code means embodied in said medium for searching, said computer readable program code means comprising;

means for labeling the content of a web site;

when at least one visitor accesses the content of a web site, means for registering the labeled accessed content in a personalized data file;

means for storing the data file for at least one visitor;

means for generating a set of pre-customized displays;

means for caching the set of pre-customized displays on the server;

when the at least one visitor accesses a Web Site, means for analyzing the data file of the visitor and associating the user with a precustomized display; and means for displaying the pre-customized display onto a web page accessed by the visitor.

17. Computer executable software code stored on a computer readable medium on a web site server computer, the code for personalizing a web site, the code comprising:

code for labeling the content of a web site with selected categories;

code for generating a data file for a visitor;

code for accumulating information regarding labeled content, to place such information in the visitor data file;

code for determining the selected category associated with the visitor's interest, wherein such determination is based on the accumulated information in the visitor data file; and code for presenting cached pre-selected web content to the visitor, wherein such pre-selected web content is associated with the selected category.

18. The computer executable software code of claim 17 further comprising code for weighting accessed information based on at least one specified variable.

19. The computer executable software code of claim 18 wherein the at least one specified variable is time of access.

* * * * *

(12) EX PARTE REEXAMINATION CERTIFICATE (9446th)
United States Patent
Makuch et al.

(10) Number: US 6,330,592 C1
(45) Certificate Issued: Dec. 18, 2012

(54) METHOD, MEMORY, PRODUCT, AND CODE FOR DISPLAYING PRE-CUSTOMIZED CONTENT ASSOCIATED WITH VISITOR DATA

(75) Inventors: Michael K. Makuch, Austin, TX (US); Neil Webber, Round Rock, TX (US)

(73) Assignee: SBJ IP Holdings I, LLC, Dallas, TX (US)

Reexamination Request:
No. 90/011,151, Sep. 10, 2012

Reexamination Certificate for:
Patent No.: 6,330,592
Issued: Dec. 11, 2001
Appl. No.: 09/205,077
Filed: Dec. 5, 1998

(51) Int. Cl.
*H04L 29/06* (2006.01)
*H04L 29/08* (2006.01)

(52) U.S. Cl. ................ 709/217; 707/999.01; 709/203; 711/118

(58) Field of Classification Search ............ None
See application file for complete search history.

(56) References Cited

To view the complete listing of prior art documents cited during the proceeding for Reexamination Control Number 90/011,151, please refer to the USPTO's public Patent Application Information Retrieval (PAIR) system under the Display References tab.

*Primary Examiner* — Samuel Rimell

(57) ABSTRACT

Visitor interests can be tracked by including "keyword directives" in content contained within the web site. These keyword directives specify a keyword indicating the type of category of information represented by the content. As the content is delivered to the visitor in the form of a web page, the number of keyword directives attached to the content is accumulated into a specified visitor profile. Over time, this visitor profile can represent the types of information the visitor has viewed and serve as an indicator of his or her preferences. In this way, the invention can accumulate a visitor profile unobtrusively, without requiring the visitors to fill out a survey or questionnaire. The profile may also be augmented with explicit information the visitor provides over time, such as a name or address provided when ordering a product from the site. The invention then delivers personalized pages to the visitor by examining such visitor's profile.

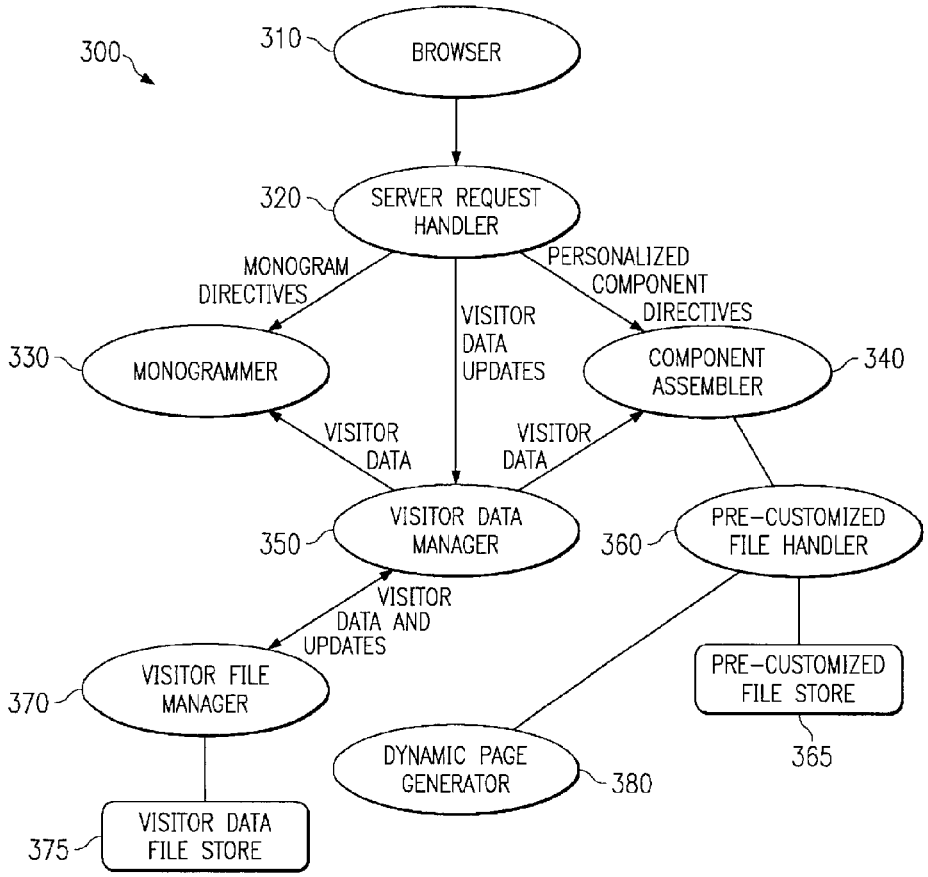

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 3-6, 8-11, 13, 16 and 17 are determined to be patentable as amended.

Claims 2, 7, 12, 14, 15, 18 and 19, dependent on an amended claim, are determined to be patentable.

New claims 20-25 are added and determined to be patentable.

1. A method of customizing a web site, said method comprising:
   labeling content of the web site;
   when at least one visitor accesses the content of [a] *the* web site, registering the labeled accessed content in a personalized data file;
   storing the *personalized* data file for the at least one visitor;
   generating at least one pre-customized display for a first visitor;
   caching the at least one pre-customized displays on [the] *a* server computer;
   displaying the at least one pre-customized display to the first visitor;
   analyzing [the data file] *a personalized data file* of a second visitor and associating the second visitor with the *same* at least one pre-customized display, wherein *said* analyzing *the personalized data file of the second visitor* is performed after *said* generating; and
   displaying [the] *said same* at least one pre-customized display to the second visitor, wherein [the] *said same* at least one pre-customized display is not regenerated before displaying [the] *said same* at least one pre-customized display to the second visitor.

3. The method of claim 2 wherein registering the labeled accessed content comprises accumulating the number of accesses to each category in the personalized data file *for the at least one visitor*.

4. The method of claim 3 wherein analyzing the *personalized* data file *of the second visitor* comprises:
   prioritizing the categories in the *personalized* data file *of the second visitor*; and
   associating the highest weighted category with at least one pre-customized display.

5. The method of claim 1 wherein [the] *said same at least one* pre-customized display is [an insert to be placed within a web content item] *a web component to be placed as a portion of a web page accessed by the second visitor*.

6. The method of claim 1 wherein [the] *said same at least one* pre-customized display is a web page.

8. The method of claim 1 wherein [storing the data file can be performed by multiple servers operating in parallel, without loss of information] *the server computer comprises at least one of a plurality of server computers operating together to provide the web site*.

9. The method of claim 1 wherein the displaying of [the] *said same at least one* pre-customized display comprises inserting a plurality of pre-customized displays onto a web page accessed by the *second* visitor.

10. A computer-readable medium having computer executable software code stored thereon, the code for personalizing a web site without dynamically generated web pages for each visitor, the code comprising:
    code for labeling [the] content of a web site with selected categories;
    *code for caching pre-selected web content on a web site server computer;*
    code for generating a data file for [a visitor] *each of a plurality of visitors*;
    code for accumulating information regarding labeled content, to place such information in the visitor data [file] *files*;
    code for determining [the selected category associated with the visitor's interest], *after the caching, a selected category associated with each visitor's interest*, wherein such determination is based on the accumulated information in [the visitor] *each visitor's* data file; and
    code for presenting *the same* cached pre-selected web content *associated with the determined selected category* to [the visitor, wherein such pre-selected web content is associated with the selected category] *each of the plurality of visitors*.

11. A computer readable memory that can direct a web site server computer to function in a specified manner, comprising:
    visitor files stored in said computer memory of said web site server computer;
    pre-customized web content items stored in said computer memory of said web site server computer; and
    executable instructions stored in said computer memory of said web site server computer, said executable instructions including
    (a) instructions to access [an] existing visitor [file] *files* for [a visitor] *visitors*;
    (b) instructions to review data in existing visitor [file] *files* to determine visitor preferences; and
    (c) instructions, based on said visitor preferences, to provide *the same* pre-customized files *from a web site server computer cache* to [visitor] *a plurality of visitors*.

13. The computer readable memory of claim 11 wherein the existing visitor [file contains] *files contain* visitor preference data.

16. A computer program product for operating a web site on a server computer, the computer program product comprising:
    a computer usable medium having computer readable program code means embodied in said medium for searching, said computer readable program code means comprising;
    means for labeling [the] content of a web site;
    when at least one visitor accesses the content of [a] *said* web site, means for registering the labeled accessed content in a personalized data file;
    means for storing the data file for at least one visitor;
    means for generating a set of pre-customized displays;
    means for caching the set of pre-customized displays on the server;
    when [the at least one] *a second* visitor accesses [a Web Site] *said web site*, means for analyzing [the] *a person-*

*alized* data file [of the visitor] *of the second visitor* and, *based on visitor preferences of said second visitor,* associating [the user] *said second visitor* with a [precustomized] *same pre-customized* display *displayed to a previous visitor*; and means for displaying [the] *said same* pre-customized display *from cache* onto a web page accessed by [the] *said second* visitor *without regenerating said same cached pre-customized display for said second visitor*.

17. Computer executable software code stored on a computer readable medium on a web site server computer, the code for personalizing a web site, the code comprising:

code for labeling [the] content of a web site with selected categories;

*code for caching pre-selected web content on the web site server computer;* code for generating [a] data [file for a visitor] *files for visitors*;

code for accumulating information regarding labeled content, to place such information in the visitor data [file] *files*;

code for determining, *after said caching,* [the] *a* selected category associated with [the] *a* visitor's interest, wherein such determination is based on the accumulated information in the visitor data file *for a visitor*; and code for presenting *the same* cached pre-selected web content *associated with the selected category* to [the visitor, wherein such pre-selected web content is associated with the selected category] *a plurality of visitors from cache*.

20. The method of claim 1, wherein:
the cached at least one pre-customized display is associated with a visitor preference; and
analyzing the personalized data file of the second visitor and associating the second visitor with said same at least one pre-customized display comprises determining that the second visitor is associated with the visitor preference based on web content items in web pages previously accessed by the second visitor.

21. The method of claim 1, wherein the personalized data file of the second visitor includes identity information provided by the second visitor at the web site.

22. The computer readable memory of claim 11, wherein:
each of the pre-customized web content items is associated with at least one visitor preference; and
providing the same pre-customized files from the web site server computer cache to the plurality of visitors based on visitor preferences comprises identifying at least one web content item based on said visitor preferences and displaying the at least one web content item from a file in the web site server computer cache.

23. The computer readable memory of claim 22, wherein the at least one web content item is a page component to be inserted from the file as a portion of a web page accessed by the plurality of visitors.

24. The computer readable memory of claim 11, wherein visitor preferences for each visitor are determined based on web content items in web pages previously accessed by said each visitor.

25. A computer program product for operating a web site on a server computer, the computer program product comprising instructions executable to perform a method comprising:

labeling content of the web site;

when at least one visitor accesses the content of the web site, registering labeled accessed content in a personalized data file for the at least one visitor storing the personalized data file for the at least one visitor;

generating at least one pre-customized display for a first visitor;

caching the at least one pre-customized display on a web site server computer;

displaying the at least one pre-customized display to the first visitor;

analyzing a personalized data file of a second visitor and associating the second visitor with a same at least one pre-customized display, wherein analyzing of the personalized data file of the second visitor is performed after said generating; and displaying said same at least one pre-customized display to the second visitor over the Internet, wherein said same at least one pre-customized display is not regenerated before displaying said same at least one pre-customized display to the second visitor.

\* \* \* \* \*